UNITED STATES PATENT OFFICE.

HUGH RODMAN, OF PITTSBURGH, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

BATTERY-SEPARATOR.

1,051,637.    Specification of Letters Patent.    Patented Jan. 28, 1913.

No Drawing.    Application filed March 24, 1908. Serial No. 422,973.

*To all whom it may concern:*

Be it known that I, HUGH RODMAN, a citizen of the United States, and a resident of Pittsburgh, in the county of Allegheny and State of Pennsylvania, have made a new and useful Invention in Battery-Separators, of which the following is a specification.

This invention relates to ceramics and more particularly to the production of a ceramic porous material.

Insoluble, chemically inert and porous articles are necessary in a number of the useful arts. In storage battery work, for instance, porous diaphragms or separators are advantageous, and porous diaphragms, receptacles, separators and other articles are necessary in carrying out a number of chemical and electro-chemical processes; but so far as I know a perfectly satisfactory method by which these articles may be manufactured has not as yet been produced.

I have discovered a material which I believe is perfectly satisfactory and from which a variety of other articles, such as filters, porous diaphragms, receptacles, lamp wicks, etc., may be made. In carrying out my invention to produce this material a mass of finely divided inert material, such, for instance, as silica sand, is thoroughly mixed with a finely divided fritting material, such, for instance, as powdered glass. This mixture is then put, while dry, into suitable molds and subjected, while still in the pulverulent state, to a fritting temperature. During this operation the separate particles of the fritting material soften and act as a binder for the entire pulverulent mass, thereby producing a porous article which is exceptionally strong and is not materially affected by sudden changes of temperature. After the mass has been subjected to the fritting temperature for a sufficient length of time the molds may be removed and the heating continued.

The method I now employ in carrying out my invention in the manufacture of storage battery separators is to thoroughly mix together two parts of finely ground silica sand and three parts of powdered glass, such as is obtained commercially. I then place the dry pulverulent mixture into molds, which may be made of cast iron or clay and subject the molded mass, while still in a pulverulent condition, to a temperature of about 1200 or 1250° F. for from 30 minutes to an hour. During this heating operation the separate particles of glass throughout the mass frit together sufficiently to allow the molded articles to be removed from the molds. I then stack the molded articles unsupported or, better, supported in dry sand in a furnace and subject them again to a temperature of about 1500° F. for a period of about 10 or 12 hours. This second heating may be termed the annealing operation. The resulting articles are exceptionally porous, much stronger than ordinary porous earthenware and more inert.

I have succeeded in producing non-porous articles by subjecting a pulverulent mass to higher temperatures than those employed by me in the manufacture of porous articles. The non-porous articles so produced are, to the best of my knowledge, superior in strength to similar articles produced by wet or pressure molding.

I am familiar with the method of manufacturing ceramics, which is technically known as dry molding. In carrying out this process a puverulent mass is mixed with just sufficient water to cause the separate particles to adhere or cohere and the mass is molded under a pressure which removes most of the moisture. The molded mass is then dried and eventually fired. The difference between this method and the method of my invention is that the separate particles are held more or less securely against settling or relative motion during the firing operation in a former method while in my method they are permitted, by the pulverulent condition of the molded mass, to settle during the firing. I believe there is a peculiar merit in the method of burning the mass while in a dry and pulverulent condition. Just what the advantage of this method is I am unable to definitely state, but I believe it is due to a settling which occurs in the pulverulent mass during the fritting operation. This settling I believe allows the separate particles of the material to adhere or cohere more closely than is possible with articles molded or set before firing.

Besides the glass and sand I have tried various substances, such, for instance, as various mixtures of clay, and glass with pumice stone, and other finely divided materials, and have produced porous as well as non-porous articles which, to the best of my knowledge, are superior in strength to similar ware produced by other methods.

It will appear to those skilled in the art that various methods may be employed in carrying out my invention and that various materials may be utilized and still fall within the spirit and the scope of my invention.

What I claim is:

1. A battery separator formed of a mass of fine sand fritted together by means of powdered glass.

2. A battery separator consisting of a porous mass of pulverulent inert material and pulverulent glass integrally united.

In testimony whereof, I have hereunto subscribed my name this 21st day of March, 1908.

HUGH RODMAN.

Witnesses:
CHARLES W. McGHEE,
E. W. McCALLISTER.